Jan. 25, 1966  L. T. MILLER  3,231,148
PUMP

Filed March 20, 1964  3 Sheets-Sheet 1

INVENTOR
Lee T. Miller

By A. G. Douvas
Attorney

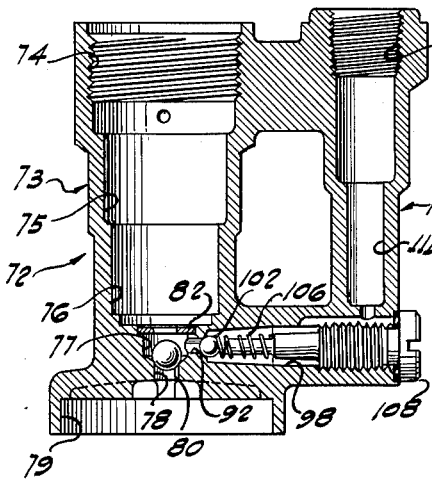
FIG. 6.
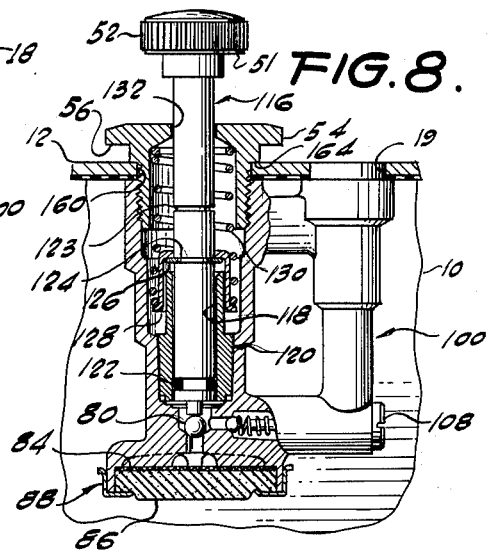
FIG. 8.
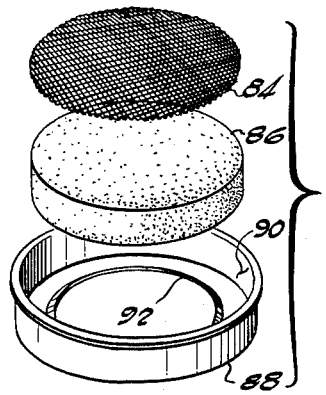
FIG. 7.
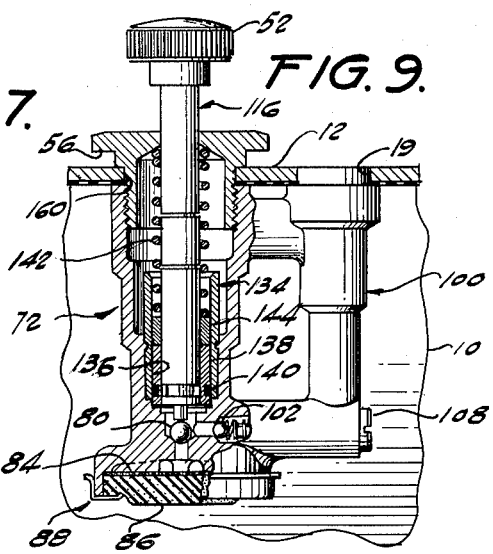
FIG. 9.
FIG. 10.
INVENTOR
Lee T. Miller
By A. G. Douvas.
Attorney

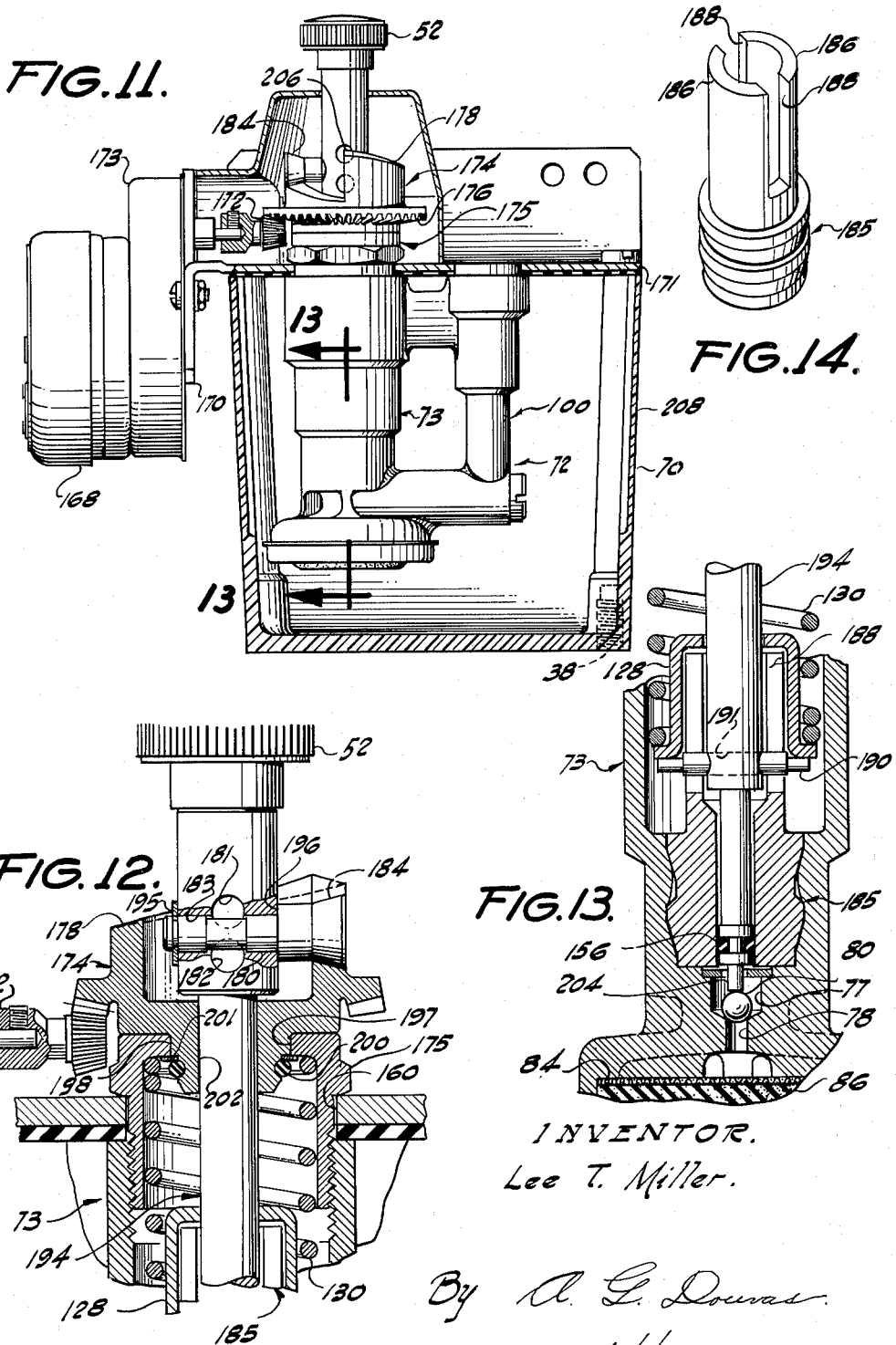

United States Patent Office  3,231,148
Patented Jan. 25, 1966

3,231,148
PUMP
Lee T. Miller, Arlington Heights, Ill., assignor to Stewart-Warner Corporation, Chicago, Ill., a corporation of Virginia
Filed Mar. 20, 1964, Ser. No. 353,436
9 Claims. (Cl. 222—288)

This invention relates to a pump, and more particularly to various structural modifications which can be applied readily to a piston pump to vary its particular operating characteristics, such as the output pressure, the stroke length, the piston bore, the timing and manner of manipulation of the pump, or the means for mounting the pump, operable thereby to produce a low cost versatile family of pumps.

In many applications, such as in automatic lubrication systems, it is necessary to pump a fluid periodically to supply it under pressure to the various receptacles of use. This is common, for example, in pressure type resistance lubrication systems where a pump periodically pressurizes the lubricating fluid which is then metered through appropriate resistance fittings or the like to the lubricated bearing within the system. It is generally desired to actuate the pump periodically, either automatically or manually, so that the proper amount of lubricant will be dispersed to the system.

Typically, each lubrication system has its particular requirements, so that the pump must operate under such different conditions to satisfy these requirements. For example, the pump might have to be actuated manually, by a mechanical drive from an operating machine, or by electric power to be fully automatic and independent of any mechanical device. Furthermore, the pump might have to be mounted in various manners, depending on the mounting provisions commonly provided on the lubricated equipment. Additionally, the pressure and volume output capacities of the pump must complement the system for which it is to be connected, so that still another variable is introduced to the specific requirements of the pump.

This invention provides a pump that, by its design, is versatile to a wide variation of specific pump requirements to give in effect an economical family of pumps.

An object of this invention is to provide a pump having components therein which most readily can be interchanged one with the other so as to establish a family of pumps of varying flow and pressure output requirements to suit most desired systems.

Another object of this invention is to provide a pump that can with only minor changes in design be actuated manually or mechanically, that can be actuated automatically, or that further can be actuated automatically by an operating machine or independently theerof by electrical power.

Another object of this invention is to provide a pump that can with only minor changes in design be mounted in any of a number of ways to its supporting structure.

Another object of this invention is to provide a pump that, with a basic body portion and only slight modifications of design can operate at wide variations of pressure and volume outputs.

Another object of this invention is to provide a pump that, by its design and without any structural modification has inlet and outlet connections that can be interchanged in location to accommodate to most fluid inlet and outlet connections for readiness in the field installation.

Another object of this invention is to provide a pump that can be electrically actuated at a predetermined time interval by means including a motor driven cam periodically forcing the pump piston in one direction which thereafter is spring biased the opposite direction to complete the pumping cycle.

In order that these and other objects can be more fully appreciated, reference is herein made to the accompanying drawings, wherein:

FIG. 6 is a view generally shown in longitudinal center section of a preferred embodiment of the pump body used in the pump of FIGS. 1 and 2;

FIG. 7 is an exploded perspective view of the filter assembly used generally with the pump body of FIG. 6;

FIGS. 8, 9 and 10 are different typical plunger assemblies formed with the pump body of FIG. 6;

FIG. 11 is a front view generally in longitudinal section of still a different embodiment of the subject pump;

FIG. 12 is an enlarged view of the pump actuating means of FIG. 11;

FIG. 13 is a sectional view as taken generally from line 13—13 in FIG. 11; and

FIG. 14 is a typical cylinder member, used specifically in the embodiment of FIGS. 11, 12 and 13.

Figure 1:
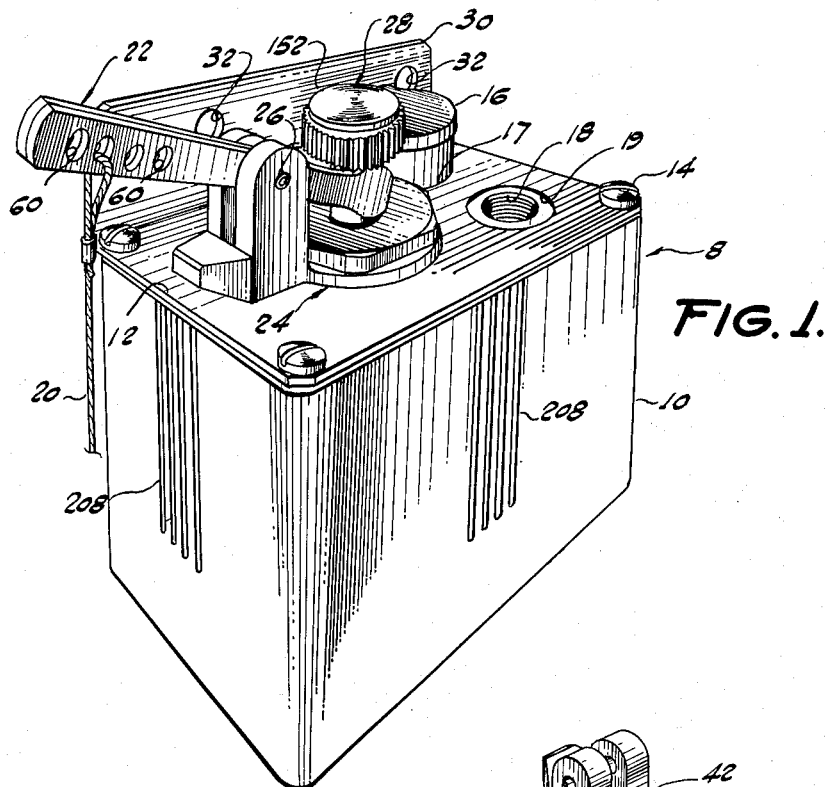
FIG. 1 is a perspective view of an embodiment of the subject pump shown in operating assembly with a mechanically actuated pull cable of a typical lubricating system.

FIG. 1 shows in a perspective view a preferred embodiment of the subject pump 8, including a reservoir 10 having across its open top a cover plate 12 held thereto by screws 14. The reservoir 10 holds a supply of fluid—commonly oil as in a lubrication sytem—which is to be pumped as required. An inlet filler cap 16 is positioned within an opening 17 in the cover plate 12 for filling the reservoir 10. The outlet of the pump is formed at threaded tap 18 extending through an opening 19 in the cover plate 12. An elbow or the like (not shown) is threaded into tap 18 for connection to the ultimate device (not shown) to which the fluid is to be pumped. The pump shown in FIG. 1 is actuated by a tension cable 20 pulled periodically by an operating machine or the like (not shown). A lever 22 pivoted to bracket 24 at pivot pin 26 is used to transmit the axial movement of the cable 20 to lift a plunger assembly 28 of the pump disposed within the reservoir 10. In the pump embodiment disclosed the plunger assembly 28 is spring biased for the pumping stroke to the fully discharged position, and is therefore primed by tension of the cable 20.

A first general improvement relates to the means of mounting the pump 8 to its appropriate supporting structure. It will be noted, for example, in FIGS. 1, 2 and 3, that the cover plate 12 has flange 30 projecting from the reservoir 8 having therein appropriate openings 32 for receipt of bolts (not shown) for connection to a supporting structure. The spacing of the openings 32 is such also so as to permit, as is many times desired in the lubricating systems, a manifold of regulating valves connected between the outlet tap 18 of the pump and the various lubricated bearings of the system. As noted in FIG. 3, the cover plate 12 can be provided with a flange like extension, such as shown in phantom at 34 and 36, extending in different directions than flange 30 for connection as desired to the appropriate supporting structure. Furthermore, the reservoir 10 can be provided at its lower corners (see FIG. 11) with threaded taps (38) for receipt of bolts for supporting the reservoir and pump assembly. If desired, all flanges including that shown at 30 and those in phantom at 34 and 36 can be eliminated from the cover plate 12.

The bracket 24 (shown in perspective in FIG. 4) consists of a ring 40 supporting spaced lugs 42 having at their upper portions aligned openings 44. The lever 22 (shown in perspective in FIG. 5) is pivoted by means of the pin 26 (FIG. 1) extending through aligned lever opening 46 and lug openings 44 in the bracket 24. The lever has bifurcated legs 48 straddling the plunger assembly 28 of the pump and arcuate contact surfaces 50 thereon that fit complementary against shoulder 51 (FIG. 8) on the underside of headed handle 52 on the plunger assembly 28. The ring 40 fits beneath a flared screw nut 54 having a shoulder 56 thereon (FIG. 8) which is adapted to tightly entrap the ring for locking the bracket relative to the cover plate. Adjustment can be made by loosening the screw nut 54 and swinging the bracket 24 about the ring 40 to vary the plane of movement of the lever 22, such as shown at the various angles 58 in FIG. 2. This adds to the versatility of the pump actuating means, including the lever 22, since it permits connection to the cable 20 (for example) coming from a plurality of directions adjacent the reservoir 10. Also, since various flanges (30, 34, 36) for example, are possible for mounting the reservoir in any of a plurality of manners, the mounting structure forms no restriction to the possible varied manipulation of the lever 22. The lever 22 further has a plurality of openings 60 at its end opposite the cam surfaces 50 for attachment, such as to the cable 20, to the mechanical actuating means. Thus, for a given axial displacement of the mechanical actuating cable 20, the plunger assembly 28 operated through the lever 22 can be raised its full stroke or a fraction thereof, depending on the proper desired cooperation.

Figure 5:
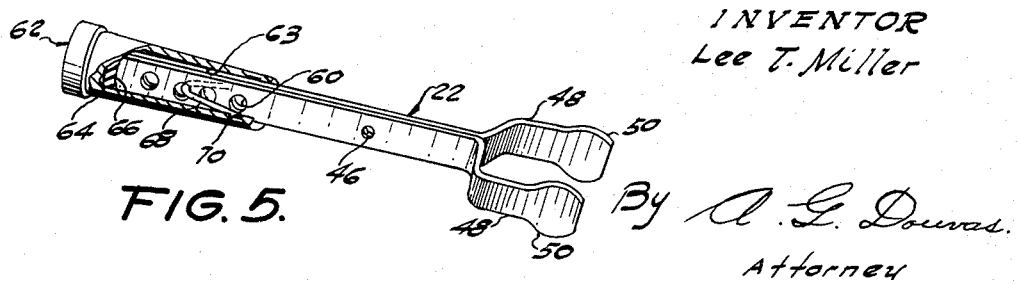
FIG. 5 is a perspective view of an actuating lever similar to that used in the embodiment of FIGS. 1 and 2, but having therein a handle for easier manual use.

FIG. 5 in addition to showing in perspective a typical lever 22 also shows a cap 62 that can be used instead of the cable actuation 20, if desired, for complete manual manipulation of the lever 22. The cap 62 consists generally of a plastic cylinder having bore 63 closed at end 64 against which is positioned a resilient rubber type bumper 66. A U-shaped spring 68 fits within one of the openings 60 on the lever and has its free ends ordinarily of greater cross dimension than the bore 63 of the cap 62. The cap 62 is positioned on the lever 22 and forced toward the pivot structure 26 until the bumper 66 is bottomed. The spring 68 thereby is compressed inwardly to dig against the bore of the cap 62. If desired, an annular shoulder 70 can be formed in the bore 63 adjacent its open end against which the free ends of the spring 68 can abut to prohibit accidental separation of the cap 62 and the lever 22. The cap improves the appearance of the pump, while further providing a better gripping surface for manual manipulation of the lever.

Referring now to the pump construction specifically, FIG. 6 shows a pump body 72 used in this family of pumps. The body 72 consists of a generally cylindrical portion 73, contracting from a large threaded bore 74 at its upper end past two smaller counterbores 75 and 76 and a series of smaller shallow bores including bores 77 and 78 to the large bore 79 at its lower end. The fluid inlet to the pump is formed through bores 79 and 78 past the ballcheck 80 to the fluid chamber defined within bore 77. An internal serrated washer 82 is pressed into the valve body to keep the ballcheck 80 from falling from bore 77 while also permitting fluid inlet to the chamber. A filter screen 84 shown in FIG. 7 fits within the cylindrical opening 79 as well as a filter element 86, and is held therein by a retainer piece 88. The retainer 88 has a spring upstanding wall 90 which fits over the outer periphery of the body 72 adjacent the cylindrical opening 79 and has provided therein a through opening 92 which communicates the inlet passage 78 with the interior of the reservoir 10.

A fluid outlet formed by bores 92 and 98 communicates the lower pump chamber 77 with a second cylindrical portion 100. A ball check 102 in bore 98 closes the smaller bore 92 that leads to chamber 77 and is biased thereagainst by compression spring 106 held in place by threaded plug 108. The fluid outlet past the ball check 102 is communicated to a vertical bore 111 within the cylindrical portion 100 of the body 72. The upper end of the bore 111 is threaded, as at tap 18, which forms the outlet for the fluid pump as shown in FIG. 1. Preferably, the body 72 is formed by die casting or the like from a conventional process.

It is from this basic body 72 that the various pump configurations disclosed herein are possible. The various pump configurations operate in virtually the identical manner and differ from one another only to the extent that certain components therein have been modified to vary the outlet characteristics of the pump. For example, in FIG. 8, the plunger assembly consists of a piston 116 received in bore 118 of a cylinder 120 in turn press-fit into the bore 76 of the cylindrical portion 73. The piston 116 has a groove at its lower end adapted for receiving an O ring sealing element 122 that cooperates with bore 118 of the cylinder 120 to define the pumping chamber open to chamber 77. The piston 116 further has spaced annular grooves 123 and 124 formed therein at a location spaced outwardly from the cylinder 120. Each groove, such as shown at 124, can receive a spring retainer ring 126 against which a spring retainer cup 128 is positioned and held in place by a compression spring 130, in turn biased at its upper end against the underside of the screw nut 54. The piston 116 fits through an opening 132 in the screw plug 54 freely, so that it can be moved axially thereof.

In operation, upward movement of the piston 116 is permitted against the compression spring 130 until being limited by the compression spring 130 bottoming on its coils. FIG. 8 corresponds to the position of the retainer ring 126 where the stroke of the pump is at its maximum. By positioning the retainer ring 126 to the annular groove 123, the spring 130 would be bottomed at a lesser upward piston stroke to limit, consequently, the return or pumping stroke of the plunger assembly. Thus, with the structure shown in FIG. 8, the stroke can be varied merely by rearranging in assembly the position of the retaining ring 126 within either annular groove 123 or 124.

The pump disclosed in FIG. 9 has most components similar to the pump shown in FIG. 8, including the body 72, the piston 116, and the entire fluid inlet and outlet arrangement. However, the cylinder 120 is not used, but instead a different cylinder 134 is press-fit into the lower bore 76 of the body and has therein a larger bore 136 than the bore 118 of the cylinder 120. An auxiliary piston head 138 is press-fit on the lower end of the piston 116 and has therein a groove for O-ring 140 for sealing with the bore 136 of the cylinder 134. Spring 142 extends between the underside of the screw plug 54 and a spacer 144 on the piston 116 above the piston head 138 to bias the piston head to its lowermost position, as seen in FIG. 9, corresponding thereat to the fully discharged position of the pump. The upward priming stroke of the pump is again limited by the spring 142 bottoming on its coils. To vary this, and consequently the volumetric capacity of the pump, the spacer 144 can be removed or varied in size as desired to increase the total pumping stroke of the unit. The only variations between the pumps disclosed in FIGS. 8 and 9 are the different cylinders 120 and 134, the auxiliary piston head 138, and the spacer 144 and spring 142 as compared to ring 126, the spring cup 128 and the spring 130. However, all of the other major components of the pump remain the same.

FIG. 10 shows still a different variation of pump construction wherein a cylinder 146 is press-fit into the bore 76 of the valve body 72, and has a bore 148 smaller than either of the bores 118 and 136 disclosed in the previous cylinders 120 and 134. The piston 150 thus is varied somewhat from the piston 116, however still having grooves 151 and 152 corresponding to the grooves 123 and 124 of the piston 116. However, the lower end 154 of the piston 150 is turned down to fit within the bore 148 of the cylinder 146 and has an annular groove therein for receipt of an O-ring 156 to form a sealing piston cylinder relationship. A spring cap 128, retainer 126 and the corresponding spring 130 are used as in the pump of FIG. 8. Thus, in all respects the pump disclosed in FIG. 10 is identical to that disclosed in FIG. 8, except for the different cylinders 146 and 120, and pistons 150 and 116. The smaller piston diameter 154 reduces output volume but increases the output pressure as compared to piston 116, all other things being equal.

Figures 2, 3, 4:
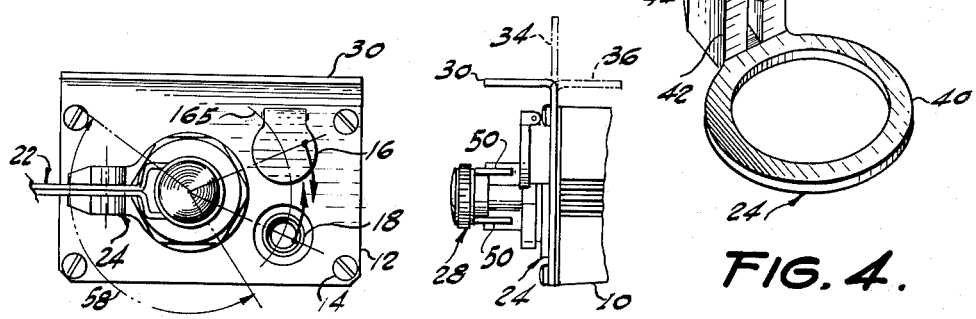
FIG. 2 is the top plan view of the pump disclosed in FIG. 1, showing slight variations therein that can be made to the subject device.
FIG. 3 is a side elevational view of the pump of FIG. 2, showing also possible variations of the subject device.
FIG. 4 is a perspective view of a pivot bracket used in the embodiment of the pump shown in FIGS. 1 and 2.

It will be noted that in the subject pump body 72, the distance between the threaded bores 74 and 18 remains constant. Consequently, if the cover plate 12 is provided with an opening such as at 160 (FIGS. 8, 9 and 10) for receipt of the screw nut 54 and two equally sized openings 17 and 19 spaced equally therefrom, that merely by rotating the pump body about the pump opening 160, the outlet tap 18 of the pump body can be aligned with either of the openings 17 or 19. Also, since the pump body is provided with the threaded openings as at 74 and 18, the cover plate 12 need not have any of the openings threaded and furthermore all sealing or securing connections are made directly to the pump body itself with the outlet elbow (not shown) and the screw nut 54. The screw nut 54 in this regard is provided with a second shoulder 164 spaced from shoulder 56 a distance less than the thickness of bracket 24 so that the nut seats firmly against the cover plate 12 or the bracket 24 in the tightened position to maintain the valve body 72 securely positioned against the cover plate 12. This permitted interchange of the inlet filler cap 16 and the outlet tap 18 on either side of the cover plate adds versatility to the pump unit, since commonly it is required in the field installations to locate either the inlet or outlet in a readily accessible or particular location to feed easily to the appropriate in the field connection. This feature is best shown in FIG. 2 where the arc 165 locates the centers of the inlet filler cap 16 and the outlet tap 18 concentrically of the opening 160.

FIGS. 11 through 14 show an entirely motorized embodiment of the pump. The pump itself including the valve body 72 and inlet and outlet check means is basically identical to that already disclosed in FIG. 10. In addition, however, an electric motor 168 supported by flange 170 on the cover plate 171 drives through an appropriate high reduction gear train 173 a pinion 172. A cam member 174 is supported rotatably on screw nut 175 annularly of the plunger assembly. The cam member 174 has on its underside a gear rack 176 that engages the pinion 172 to be driven thereby around the plunger assembly. The upper side of the cam member 174 has a cam surface 178 inclined axially of the plunger assembly movement. A cam follower 180 is in turn supported rotatably within any of the axially spaced openings 181, 182 or 183 (as shown) on the plunger assembly and has a cam roller 184 adapted to engage rollingly the cam surface 178.

A cylinder 185 (FIGS. 13 and 14) is press-fit into the open bore 76 of the pump body 72 and has therein spaced lugs 186 forming therebetween aligned channels 188. A pin 190 in turn positioned within an appropriate opening 191 in the plunger assembly fits within the channels 188 to prevent rotation of the plunger assembly about its longitudinal axis. The plunger assembly shown in FIG. 13 differs from that of FIG. 10 to the extent that the cross-bore 191 is formed in the piston 194 for receipt of the pin 190 and the cylinder 185 is used having the aligned channels 188. The retainer cap 128 over the cylinder 185 abuts the pin 190 and presents a shoulder against which the compression spring 130 seats. The piston 194 is spring biased its pumping stroke to discharge fluid from the chamber 77. A spring retainer 195 snapped within an annular groove on the cam follower 180 and a shoulder 196 on the cam follower hold the follower rotatably to the piston 194.

It should be noted that the cam surface 178 is tapered from its high point near its center to its low point away from its center, and likewise the cam roller 184 has a similar complementary taper. This is to give a true rolling motion of the roller 184 on the cam surface to compensate for the different radii from the center of the piston and consequently the different peripheral speed required of the roller for a given rotation. Also, the screw nut 175 is shown differing from that at 54 in the previous embodiments, as having enlarged opening 197 to accommodate a lower projecting cylindrical portion 198 on the cam member 174 having further a washer 201 and a spring retainer 200 to lock them together rotatably. The cam member 174 in turn, has a bore 202 for receipt of the piston 194, and the piston has a reduced diameter 204 (FIG. 13) to bear against the ballcheck 80 to limit its downward pumping stroke.

Upon rotation of the pinion 172 the cam member 174 is caused to rotate in a counterclockwise direction as seen from top views of either FIG. 11 or 12. This in turn causes the cam roller 184 carried by piston 194 to ride up the inclined surface 178 until it reaches the upper edge 206. At this time the cam no longer supports the piston 194 so as to permit the spring 130 to return the piston from its pumping stroke to its fully discharged position (FIG. 13).

The stroke of the embodiment disclosed in FIGS. 11 through 13, is varied by repositioning the follower 180 in any of the various openings 181, 182 or 183 as shown. The stroke upwardly thus is varied since only a portion of the cam surface 178 is used to lift the cam roller 184, it being held elevated above the cam surface by the abutment of the lower end 204 of the piston with the ballcheck 80. Thus, with the follower 180 located in the top opening 181, the pump stroke is the shortest to have the minimum pump capacity, while conversely, with the follower in the bottom opening 182 the pump stroke is the longest to have the maximum pump capacity.

The pump embodiment disclosed in FIGS. 11 through 13 is operated, as is well known in the art, by independent electric means which power the motor 168. The operating frequency of the pump can be varied as required depending on the speed of motor or the gear reduction used between the motor and the pinion 172. Typically, the motor would be in a circuit operated in turn by the machine to be lubricated so that during continuous operation of the motor, a pumping cycle would occur approximately every 10 or 15 minutes—depending on the requirements.

It should be noted also that the subject pump family is virtually maintenance free since, for example, side recesses 208 formed in the reservoir (FIGS. 1 and 11) provide for ready outside visual inspection of the oil level within the reservoir by noting the slight color change at the liquid surface. To this end, the reservoir is fabricated of a transluscent material.

Each of the disclosed pumps also can be manipulated manually merely upon an operator grasping the enlarged retainer nut 52 and lifting it and the plunger assembly against the compression spring of the pump. Also, although the pumps disclosed herein are spring biased on the pumping stroke and mechanically actuated on the priming stroke, such could readily be reversed. However, the disclosed arrangement is preferred for lubrication systems since the outlet characteristics of the pump are more uniform.

While only specific embodiments of the subject invention have been disclosed, it will be obvious to those skilled in the art that structural modifications can be made therefrom without departing from the inventive concept of the disclosure. Accordingly, it is desired that the invention be limited only by the scope of the claims hereinafter following.

What is claimed is:

1. A pump, comprising a pump body having an open bore, a pump cylinder fitted into the open bore and having a cylinder bore of a selected smaller diameter, a pump piston fitted sealingly into the cylinder bore defining therein a fluid pumping chamber, fluid inlet means for said pumping chamber, fluid outlet means of fixed length for the pumping chamber, a reservoir, and a cover plate covering the reservoir and having a first opening therein for receiving the pump piston and having equally spaced therefrom second and third equally sized openings, said cover plate supporting the pump body within the reservoir so that the fluid inlet means is below the level of the fluid therein and the fluid outlet means of fixed length is interchangeably connected with either said second or third openings and the other of said second and third openings enables the supply of said fluid to said reservoir.

2. A pump, comprising a pump body having an open bore, a pump cylinder fitted into the open bore and having a cylinder bore of a selected smaller diameter, a pump piston fitted sealingly into the cylinder bore defining therein a fluid pumping chamber, fluid inlet means for said pumping chamber, fluid outlet means of fixed length for the pumping chamber, a spring between the pump piston and the pump body operable to drive the piston in one direction of its stroke, a reservoir, a cover plate covering the reservoir and having a first opening therein for receiving the pump piston and having equally spaced therefrom second and third equally sized openings, said cover plate supporting the pump body within the reservoir so that the fluid inlet means is below the level of the fluid therein and the fluid outlet means is interchangeably connected with either said second opening or said third opening with the other one of said second or third opening enabling the filling of said reservoir, a filler cap in the other one of said second or third openings for closing the reservoir, and means on the cover plate outside of the reservoir for manipulating the pump piston in the opposite direction of its stroke.

3. A pump, comprising a pump body having an open bore, a pump cylinder fitted into the open bore and having a cylinder bore of a selected smaller diameter, a pump piston fitted sealingly into the cylinder bore defining therein a fluid pumping chamber, fluid inlet means for said pumping chamber, fluid outlet means of fixed length for the pumping chamber, the pump piston extending to the exterior of the pump cylinder and the pump body, a reservoir, a cover plate covering the reservoir, said cover plate having a first opening therein for receiving the extension of the pump piston and having second and third equally sized openings therein spaced equally from said first opening, means including a nut screwed into the pump body through the first opening for securing the pump body to the cover plate with the pump inlet within the reservoir below the level of the fluid therein and the pump outlet lined up with either one of the second or third openings, a filler cap fitted into the other one of said second or third openings for filling the reservoir with the fluid, a spring biasing the pump piston in a given direction of its stroke, means for varying the compressive force exerted between the spring and pump piston and furthermore for varying the position of the stroke at which the spring bottoms on its respective coils operable thereby to vary the maximum stroke of the pump piston, and means for manipulating the pump piston in the opposite direction of its stroke.

4. The pump claimed in claim 3 in which said manipulating means includes a mounting bracket held on the cover plate by the securing nut so as to be rotatable relative to the cover plate about the axis of the pump piston when the nut is loosened and to be held securely in any of the adjustable positions when the nut is tightened, and a lever pivoted to the mounting bracket and having one of its ends connected to the pump piston for actuation thereof and having its opposite end actuated by an outside source.

5. A pump, comprising a pump body having an open bore, a pump cylinder fitted into the open bore and having a cylinder bore of a selected smaller diameter, a pump piston fitted sealingly into the cylinder bore to define therein a fluid pumping chamber, fluid inlet means for said pumping chamber, fluid outlet means of fixed length for the pumping chamber, a reservoir, a cover plate covering the reservoir, means including a screw nut extending through an opening in the cover plate supporting the pump body to the cover plate, the cover plate further having two equally sized openings therein spaced equally from the first mentioned opening operable thereby to receive in either of two positions the pump outlet for the pump, a filler cap fitted into the other of the spaced openings for filling the reservoir with fluid as required, a spring biasing the piston in one direction of its stroke to effect a pumping stroke, means for manipulating the pump piston in the opposite direction of its stroke against the bias of the spring to effect a priming stroke, means including a plurality of axially spaced transverse shoulders formed on the pump piston positionable to selected positions for varying the extent of the priming stroke at which the spring bottoms operable thereby to vary also the pumping stroke, and the cover plate further having at least one flange projecting from the reservoir and including mounting holes therein operable for establishing a readily direct connection to an appropriate supporting structure.

6. A pump comprising a pump body having an open bore, a pump cylinder fitted into the open bore and having a cylinder bore of a selected smaller diameter, a pump piston fitted sealingly into the cylinder bore for defining a fluid pumping chamber and having a rod extending to the exterior of the pump cylinder and the pump body, fluid inlet and outlet means for the pumping chamber, a reservoir, a cover plate covering the reservoir and having an opening therein, means for securing the pump body annularly of the pump piston through said opening in the cover plate on operation of said securing means in one direction with the pump inlet located below the fluid level in the reservoir, a spring biasing the pump piston in one direction, a mounting bracket held on the cover plate by said securing means and adjustable rotatably relative to the cover plate about the axis of the pump piston if said securing means is operated in another direction and held securely in an adjusted position in response to the operation of said securing means in said one direction, a lever pivoted to the mounting bracket intermediate the lever ends with one end of said lever connected to said rod for manipulating said piston against the bias of said spring in response to the opposite end of said lever being actuated by a power source, the other end of said lever having a plurality of axially spaced openings therein, a cap having a bore for receipt over said lever other end, and a U-shaped spring received within one of said lever openings with the legs of said U-shaped spring biased normally outwardly and spaced apart by a larger dimension than said cap bore for inward movement in response to receipt of said cap on said lever other end to engage the wall of said cap bore for retaining said cap on said lever.

7. A pump comprising a pump body having an open bore, a pump cylinder fitted into the open bore and having a cylinder bore of a selected smaller diameter, a pump piston fitted sealingly into the cylinder bore for defining a fluid pumping chamber and having a rod extending to the exterior of the pump cylinder and the pump body, fluid inlet and outlet means for the pumping chamber, a reservoir, a cover plate covering the reservoir and having an opening therein, means for securing the pump body annularly of the pump piston through said opening in the cover plate on operation of said securing means in one direction with the pump inlet located below the fluid level in the reservoir, a spring biasing the pump piston in one direction, a mounting bracket held on the cover plate by said securing means and adjustable rotatably relative to the cover plate about the axis of the pump piston on operation of said securing means in another direction and held securely in an adjusted position in response to the operation of said securing means in said one direction, and a lever pivoted to the mounting bracket intermediate the lever ends with one end of said lever connected to said rod for manipulating said piston against the bias of said spring in response to the opposite end of said lever being actuated by a power source, the other end of said lever having a plurality of axially spaced openings therein, a cap having a bore for receipt over the said lever other end, a U-shaped spring received within one of said lever openings with the legs of said U-shaped spring biased normally outwardly and spaced apart by a larger dimension than said cap bore for inward movement in response to receipt of said cap on said lever other end to engage the wall of said cap bore for retaining said cap on said lever, a bumper of resilient material positioned between the closed end of said cap bore and said lever other end to maintain a continuing axial force tending to separate the cap and lever for controlling the legs of said U-shaped spring to engage the wall of said cap bore, and an annular shoulder formed on the wall of said cap bore passing over the legs of said U-shaped spring to maintain the lever and cap connected securely.

8. A pump comprising a pump body having an open bore, a pump cylinder fitted into the open bore and having a cylinder bore of a selected smaller diameter, a pump piston fitted sealingly into the cylinder bore for defining a fluid pumping chamber and having a piston rod extending to the exterior of the pump cylinder and the pump body, fluid inlet and outlet means for the pumping chamber, a reservoir, a cover plate covering the reservoir, means for securing the pump body to the cover plate with the pump inlet located below the fluid level in the reservoir, a spring biasing the pump piston in one direction, a cam member rotatably carried by the cover plate and having a cam surface extending in a direction parallel to the axis of the pump piston, means engaging said piston rod and the cam surface for manipulating the pump piston in a direction opposite the bias of said spring in response to the rotation of said cam surface, a gear rack formed on the one side of said cam member, a motor supported by the cover plate, a pinion driven by said motor and engaging said gear rack for rotating said cam member and cam surface, and means including an interlocking pin and channel engaging the piston rod with said valve body for preventing rotation of the pump piston about its longitudinal center axis.

9. A combination for use with any one of a plurality of pump cylinders each having an outer wall of the same diameter and each having a cylinder bore of a different diameter for receiving a respective pump piston of a diameter corresponding to the respective bore diameter to define thereby a portion of a fluid pumping chamber of respective volume, the improvement comprising a pump body having a bore open at one end for receiving any one of said pump cylinders and sealingly engaging the outer wall of each said cylinders irrespective of said cylinder bore diameter, a closed end for said pump body bore integrally formed on said pump body, means carried by said pump body for spacing each said cylinder with respect to said closed end to complete said pumping chamber, and fluid inlet and outlet means formed in said pump body for communicating said pumping chamber with a fluid supply and an outlet conduit, respectively.

References Cited by the Examiner
UNITED STATES PATENTS

| | | | |
|---|---|---|---|
| 789,891 | 2/1905 | Lockwood | 103—213 X |
| 1,289,505 | 12/1918 | Mariner | 222—174 X |
| 2,407,765 | 9/1946 | Palmer | 222—180 |
| 2,554,802 | 5/1951 | Waas | 222—385 X |
| 2,627,814 | 2/1953 | Davis | 222—385 X |
| 2,899,017 | 8/1959 | Liljemark | 222—385 |
| 2,951,556 | 9/1960 | Jackson et al. | 103—213 X |
| 3,072,300 | 1/1963 | Thomas | 222—333 |

LOUIS J. DEMBO, *Primary Examiner.*

HADD S. LANE, *Examiner.*